July 7, 1959  J. L. HINTZMAN ET AL  2,893,682
BUTTERFLY VALVE AND SEAL
Filed July 6, 1953
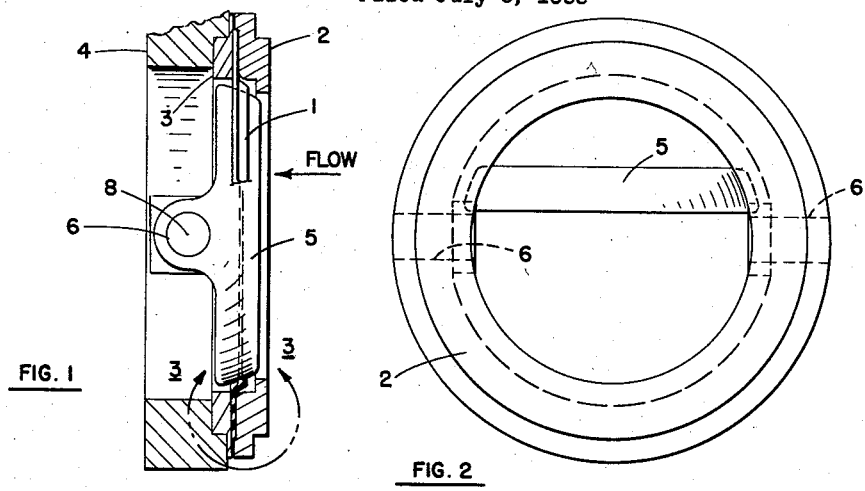
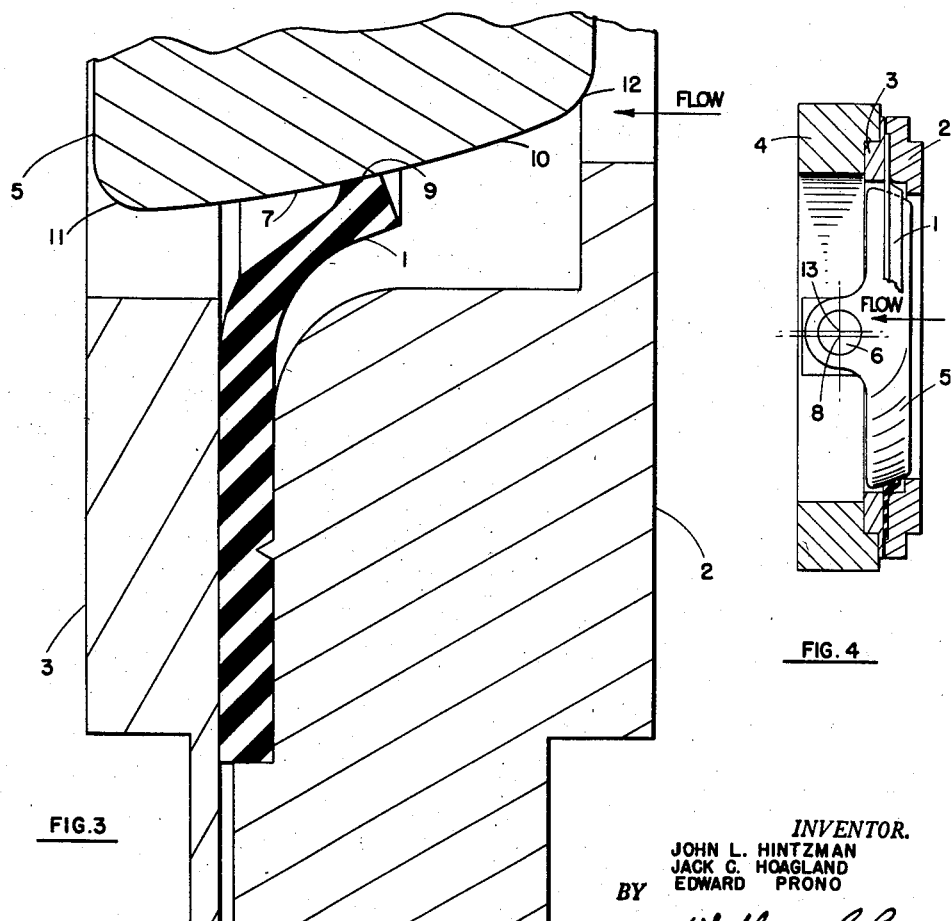
INVENTOR.
JOHN L. HINTZMAN
JACK C. HOAGLAND
BY EDWARD PRONO
*William R Lane*
ATTORNEY United States Patent Office 2,893,682
Patented July 7, 1959

2,893,682

BUTTERFLY VALVE AND SEAL

John L. Hintzman, South Gate, Jack C. Hoagland, Pasadena, and Edward Prono, Glendale, Calif., assignors to North American Aviation, Inc.

Application July 6, 1953, Serial No. 366,164

5 Claims. (Cl. 251—173)

This invention pertains to a butterfly valve and seal of improved design and, in particular, to a butterfly valve and seal wherein fluid pressure upstream of the valve and seal increases the sealing effectiveness thereof.

In general, butterfly valves and seals for controlling the flow of a fluid through a pipe rely upon a flexible seal and a forced fit between the butterfly and the seal to prevent fluid from flowing around the edge of the valve. Such valves tend to cause permanent deformation of the seal because of the force of the butterfly against the seal. In addition, the friction and interference between the butterfly and the seal causes excessive wear and flexing of the seal, which results in a short life. At extremely low temperatures, flexing of the seal causes the seal to crack.

The device contemplated by this invention relies upon a mere sliding contact between the butterfly and the seal and relies upon the upstream pressure to force the seal against the butterfly to increase the sealing properties thereof. The butterfly contemplated by this invention is substantially a zonal segment of a sphere, while the lip seal of this invention has an effective surface which is substantially a zonal segment of a spherical socket. Hence, the geometrical relation between the butterfly and seal of this invention is identical to the geometrical relation between a ball and socket as further explained herein.

It is therefore an object of this invention to provide an improved butterfly valve and seal.

It is another object of this invention to provide an improved butterfly valve.

It is another object of this invention to provide an improved butterfly valve seal.

It is another object of this invention to provide a zonal ball and socket type butterfly valve and seal.

Other objects of invention will become apparent from the following description taken in connection with the accompanying drawings in which:

Fig. 1 is a side view, partly in section, of a first embodiment of this invention, with the butterfly in the closed position;

Fig. 2 is a plan view of the embodiment of this invention shown in Fig. 1, with the butterfly full open;

Fig. 3 is a section view of the portion of Fig. 1 enclosed by arrows 3—3;

And Fig. 4 is a side view, partly in section, of a second embodiment of this invention with the butterfly in the closed position.

In Figs. 1, 2, 3, and 4, sealing means 1 is supported by support rings 2 and 3 within fluid conduit means or pipe 4. Butterfly 5 is supported to be rotated upon shaft 6 which passes through the wall of pipe 4. The side surface 7 of butterfly 5 has a contour which is in the shape of a zonal segment of a sphere, whose center is upon the axis 8. In Figs. 1 and 2, axis 8 is also the axis of rotation of shaft 6. In Fig. 4, axis 13 is the axis of rotation of shaft 6. Axis 13 is displaced in a direction perpendicular to the flow direction, from axis 8.

Notice that zonal surface 7 is not a symmetrical zone of its sphere, but is eccentric to the equator of the sphere of which it is a part. Surface 9 of seal 1 is preferably in the shape of a zonal segment of a sphere and mates exactly with the portion of surface 7 which is adjacent to surface 9 when butterfly 5 is in its fully closed position. Surface 7 is relieved at 11 and 12 so that when butterfly 5 is rotated to open or close the valve it does not damage lip seal 1 at the point of engagement. While surface 9 is preferably spherical in shape, practically speaking, if surface 9 is thin enough so that the angle which it subtends is so small that the chord approximates the arc, a surface such as a cone can be substituted for a sphere. When surface 9 is conical, rather than spherical, the downstream side of seal 1 must be relieved to prevent interference with butterfly 5. While surface 9 preferably mates with that portion of surface 7 which is designated at 10 in Fig. 3, when surface 9 is not spherical, it is desirable to relieve the portion 10 of surface 7. The relief is desirable so that when butterfly 5 is turned so that the portion shown in Fig. 3 moves to the left, it does not engage seal 1 and thereby distort it. Seal 1 is a ring which has a lip seal. The lip is the portion of seal 1 which is adjacent surface 9.

In operation, butterfly 5 slides easily in seal 1 to rotate about the axis of rotation of shaft 6. When butterfly 5 is closed, the pressure upstream of seal 1 is greater than the pressure downstream of seal 1, and this difference of pressure creates a force upon seal 1 which presses surface 9 more tightly against surface 7 to increase the seal effectiveness.

When seal 1 is made thin enough, it acts as a pressure relief valve to allow gases to flow from the downstream side to the upstream side of butterfly 5. For example, when the valve of this invention is utilized to control the flow of extremely cold liquids, gases may be trapped downstream of butterfly 5 and build up a pressure which is higher than the pressure upstream of butterfly 5. When this happens, seal 1 flexes and allows pressure relief through the resultant opening at surface 9. This is an added desirable feature of the device of this invention.

The device shown in Fig. 4 is adapted to be turned through only a quarter turn in a clockwise direction. If the center of rotation had been placed below the center of curvature, the device would have been adapted to be turned through only a quarter turn in a counter-clockwise direction. Rotation of butterfly 5 about axis 13 causes a simultaneous rotation of butterfly 5 about axis 8, and a rotation of axis 8 about axis 13. As the rotation of butterfly 5 commences to open the valve, the rotation of axis 8 about axis 13 is substantially a translation in the direction of flow. By the time the component of movement of axis 8, in a direction perpendicular to the flow, is significant, butterfly 5 has translated in a downstream direction away from seal 1. Thus, the eccentricity of the rotation about axis 13 causes butterfly 5 to disengage seal 1 very rapidly when the valve starts to open.

The device of this invention is particularly adapted to control the flow of fluids or gases at extremely low temperature, for example, the flow of liquid oxygen. When seal 1 is fabricated of a material which will withstand extremely low temperatures and still remain flexible, the device of this invention is very effective. One example of a material which is suitable as a seal for extremely low temperatures is Polytrifluorochloroethylene, commonly designated by the trade name of Kel-F.

Thus the device of this invention provides a butterfly valve and seal which is effective over a wide range of temperatures and which has a mere sliding contact between the butterfly and the seal, whereby the seal is not flexed by an appreciable amount to cause deterioration, permanent set, and leakage.

Although the invention has been described and illustrated in detail, it is to be clearly understood that the same is by way of illustration and example only and is not to be taken by way of limitation, the spirit and scope of this invention being limited only by the terms of the appended claims.

We claim:

1. An improved butterfly valve comprising fluid conduit means, shaft means rotatably mounted in the walls of said fluid conduit means, butterfly means eccentrically attached to said shaft means, and integral seal means attached to the wall of said fluid conduit means adjacent said butterfly means said seal means continuously divergently extending from said walls in the upstream direction, a contact surface upon said butterfly means being in sliding contact with a contact surface upon said seal means, said surfaces being inclined within said conduit means, said seal means and said contact surfaces adapted to cause upstream pressure to press said seal means against said butterfly means to increase the sealing effectiveness thereof.

2. An improved butterfly valve comprising fluid conduit means, a shaft passing through the walls of said fluid conduit means, a butterfly eccentrically mounted upon said shaft for translational and rotational movement, sealing means secured in said walls adjacent said butterfly means, a continuous annular lip member upon said sealing means converging in the upstream direction, a surface of said sealing means being inclined away from the flow of said fluid and contacting said butterfly when said butterfly is closed said sealing means and said butterfly cooperating to utilize the upstream pressure to press said seal means against said butterfly means to increase the sealing efficiency thereof.

3. An improved butterfly valve comprising fluid conduit means, a shaft mounted in the walls of said fluid conduit means, a butterfly eccentrically mounted on said shaft for rotation with said shaft and translational movement in a downstream direction, said butterfly having a peripheral sealing surface in the general shape of a zonal segment of a sphere, said sealing surface converging in the upstream direction, an integral lip seal secured in said walls of said conduit means, extending continuously upstream divergently from said walls and having an inner peripheral surface complementary to said sealing surface of said butterfly, said inner peripheral surface in position to fit on said butterfly sealing surface when said butterfly is in the closed position, said lip member and said inner peripheral surface cooperatively utilizing upstream pressure to effectuate a positive seal between said seal means and said butterfly means.

4. A butterfly valve comprising fluid conduit means, a shaft transversely mounted across said conduit means rotatable with respect to the wall thereof, a butterfly mounted for rotation upon said shaft, said butterfly having a peripheral sealing surface generally convergent in the upstream direction, and a lip seal having a first portion sealably secured in said wall and a second flexible portion extending generally convergently upstream, said second portion having an inner peripheral surface complimentary to said sealing surface of said butterfly and sealable therewith when said butterfly is in the closed position and being adapted to be flexed inwardly against said peripheral sealing surface by upstream fluid pressure.

5. A butterfly valve comprising a fluid conduit means, a shaft mounted transversely of said conduit means for rotation therein, a circular butterfly valve having a transversely curved sealable surface on a peripheral edge thereof, said sealable surface converging in the upstream direction, said butterfly mounted eccentrically on said shaft with respect to the center of curvature of said curved surface, a flexible ring-shaped lip seal surrounding and fitted to be in congruent contact with said sealable surface of said butterfly whereby line pressure effects a positive seal when said valve is closed and rotation of said shaft translates and moves said butterfly sealing surface from engagement with said lip seal.

References Cited in the file of this patent

UNITED STATES PATENTS

| | | |
|---|---|---|
| 676,526 | Anderson | June 18, 1901 |
| 1,272,460 | Knoll | July 16, 1918 |
| 1,744,798 | Price | Jan. 28, 1930 |
| 2,059,656 | Ring | Nov. 3, 1936 |
| 2,586,927 | Fantz | Feb. 26, 1952 |
| 2,655,942 | Dougherty | Oct. 20, 1953 |

FOREIGN PATENTS

| | | |
|---|---|---|
| 1,922 | Great Britain | Aug. 22, 1859 |
| 22,932 | Great Britain | Feb. 8, 1912 |
| 248,968 | Italy | May 18, 1926 |
| 613,700 | Germany | May 24, 1935 |
| 1,111,630 | France | Nov. 2, 1955 |
| 753,860 | Great Britain | Aug. 1, 1956 |